(12) United States Patent
Xu et al.

(10) Patent No.: US 10,768,379 B2
(45) Date of Patent: Sep. 8, 2020

(54) SYNCHRONOUS MONITORING DEVICE AND METHOD FOR RADIAL AND AXIAL VIBRATION OF SHEARER DRUM

(71) Applicants: CHINA UNIVERSITY OF MINING AND TECHNOLOGY, Xuzhou (CN); XUZHOU ZHONGMINE TRANSMISSION TRACK TECHNOLOGY CO., LTD., Xuzhou (CN)

(72) Inventors: Shaoyi Xu, Xuzhou (CN); Wei Li, Xuzhou (CN); Fangfang Xing, Xuzhou (CN); Yuqiao Wang, Xuzhou (CN); Xuefeng Yang, Xuzhou (CN); Mengbao Fan, Xuzhou (CN); Ruilin Wang, Xuzhou (CN); Xianghui Wang, Xuzhou (CN); En Lu, Xuzhou (CN); Jinyong Ju, Xuzhou (CN); Lianchao Sheng, Xuzhou (CN)

(73) Assignees: CHINA UNIVERSITY OF MINING AND TECHNOLOGY, Xuzhou (CN); XUZHOU ZHONGMINE TRANSMISSION TRACK TECHNOLOGY CO., LTD, Xuzhou (CN)

( * ) Notice: Subject to any disclaimer, the term of this patent is extended or adjusted under 35 U.S.C. 154(b) by 11 days.

(21) Appl. No.: 16/339,375

(22) PCT Filed: Jun. 25, 2018

(86) PCT No.: PCT/CN2018/092537
§ 371 (c)(1),
(2) Date: Apr. 4, 2019

(87) PCT Pub. No.: WO2019/041988
PCT Pub. Date: Mar. 7, 2019

(65) Prior Publication Data
US 2020/0233153 A1    Jul. 23, 2020

(30) Foreign Application Priority Data

Aug. 30, 2017   (CN) .......................... 2017 1 0765637

(51) Int. Cl.
*G02B 6/38*    (2006.01)
*G01H 9/00*    (2006.01)

(52) U.S. Cl.
CPC ............. *G02B 6/385* (2013.01); *G01H 9/004* (2013.01)

(58) Field of Classification Search
CPC .............................. G02B 6/385; G01H 9/004
See application file for complete search history.

(56) References Cited

U.S. PATENT DOCUMENTS

2009/0323074 A1   12/2009   Klebanov

FOREIGN PATENT DOCUMENTS

| CN | 2625862 Y | 7/2004 |
|---|---|---|
| CN | 1862239 A | 11/2006 |

(Continued)

*Primary Examiner* — Hina F Ayub
(74) *Attorney, Agent, or Firm* — Bayramoglu Law Offices LLC

(57) ABSTRACT

A synchronous monitoring device and a method for radial and axial vibration of a shearer drum. The monitoring device includes a laser, a first optical fiber coupler, an optical isolator, a second optical fiber coupler, a third optical fiber coupler, an optical fiber collimator, a first photodetector, a second photodetector, a first signal processing module, and a second signal processing module which are disposed on a shearer ranging arm, as well as a reflective coating disposed on a shearer drum. By measuring a phase difference between original light and reflected light, axial vibration of the shearer drum is monitored, and by measuring an intensity difference between original light and reflected light, radial vibration of the shearer drum is monitored.

7 Claims, 1 Drawing Sheet

(56) References Cited

FOREIGN PATENT DOCUMENTS

| CN | 101008583 A | 8/2007 |
|----|-------------|--------|
| CN | 106225906 A | 12/2016 |
| CN | 107490430 A | 12/2017 |

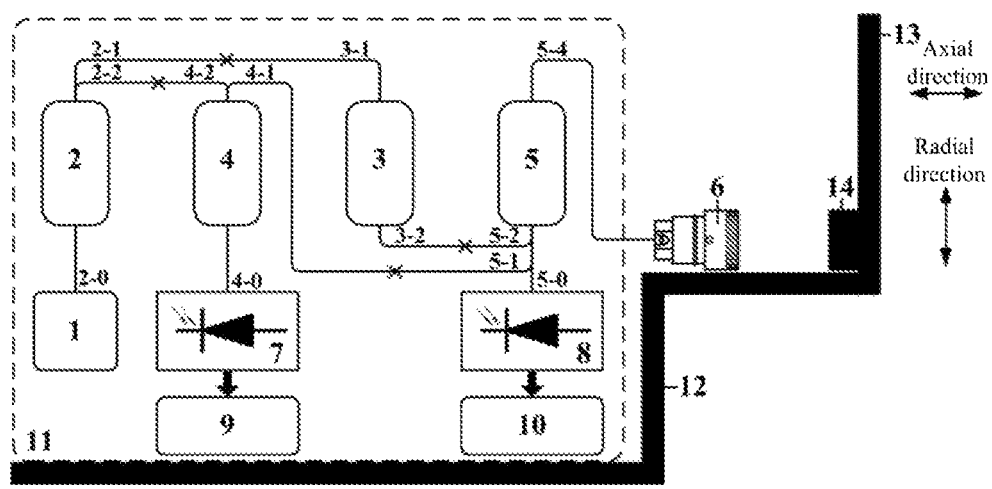

SYNCHRONOUS MONITORING DEVICE AND METHOD FOR RADIAL AND AXIAL VIBRATION OF SHEARER DRUM

CROSS REFERENCE TO THE RELATED APPLICATIONS

This application is the national phase entry of International Application No. PCT/CN2018/092537, filed on Jun. 25, 2018, which is based upon and claims priority to Chinese Patent Application No. 201710765637.3, filed on Aug. 30, 2017, the entire contents of which are incorporated herein by reference.

TECHNICAL FIELD

The present invention belongs to the technical field of health state monitoring of fully-mechanized mining equipment in underground coal mines, and relates to a detection device and a monitoring method for the health state of a shearer, and in particular, to a synchronous monitoring device and method for radial and axial vibration of a shearer drum.

BACKGROUND

China is rich in coal resources. Coal is also a main energy source and raw material for consumption in China, and it will always dominates in energy sources in the current and future period. Therefore, whether the coal mining industry can develop healthily and steadily will directly affect further improvement and development of all walks of life in China.

The health state of a shearer, as one important mining equipment in underground coal mines, is directly related to efficient and safe mining of coal mines. Since the shearer operates all year round in high-dust concentration, high-impact load, high-temperature and high-pressure, and humid environment, the stability and reliability thereof will be affected by the harsh environment. Once a fault occurs, production halts will be caused in the entire fully-mechanized mining face, thereby leading to considerable economic damage. Therefore, the health state of the shearer must be monitored in real time.

A drum is a mechanism for coal cutting, coal dropping and coal loading directly on the shearer, and it is essential to ensure normal, safe and smooth operation of the drum in order to guarantee the efficiency of coal mining. As a typical rotating machine, the drum is prone to axial misalignment, structural fracture and other faults, and 80% of the faults can be reflected by vibration anomalies. Therefore, a vibration signal of the drum contains rich state information, so it is necessary to monitor the vibration signal of the shearer drum in real time without shutdown or disassembly, and the vibration signal is analyzed to determine the deterioration degree and fault nature of the shearer drum.

In current practical applications, the indirect method is generally adopted for vibration monitoring of the shearer drum, that is, a sensor and a monitoring system are mounted on a mechanical structure and a power device (such as a ranging arm) near the shearer drum and directly associated with the shearer drum, and an electrical vibration sensor and monitoring system are generally adopted. Researches show that synchronous monitoring of radial and axial vibration of the shearer drum is difficult to realize with such an indirect monitoring method in practical applications, and the monitoring process is easily interfered by a strong electromagnetic field in the fully-mechanized mining face, so that the monitoring sensitivity is low, and thus the health state of the shearer drum cannot be directly and accurately reflected.

SUMMARY

Technical Problem

For the problems in the prior art, the present invention provides a synchronous monitoring device and method for radial and axial vibration of a shearer drum, enabling direct, non-contact and synchronous real-time monitoring of radial and axial vibration of the shearer drum without shutdown or disassembly. The device and the method have strong anti-interference capability and high monitoring sensitivity and precision, and are easy to operate.

Technical Solution

To achieve the foregoing objective, the technical solution of the present invention is as follows: a synchronous monitoring device for radial and axial vibration of a shearer drum, comprising: a laser, a first optical fiber coupler, an optical isolator, a second optical fiber coupler, a third optical fiber coupler, an optical fiber collimator, a first photodetector, a second photodetector, a first signal processing module, and a second signal processing module, wherein a port 20 of the first optical fiber coupler is connected to an output end of the laser, a port 21 is connected to a port 31 of the optical isolator, and a port 22 is connected to a port 42 of the second optical fiber coupler, the port 21 and the port 22 being located at the same side of the first optical fiber coupler and are opposite to the port 20; a port 32 of the optical isolator is connected to a port 52 of the third optical fiber coupler; a port 40 of the second optical fiber coupler is connected to an input end of the first photodetector, and a port 41 is connected to a port 51 of the third optical fiber coupler, the port 41 and the port 42 being located at the same side of the second optical fiber coupler and are opposite to the port 40; a port 50 of the third optical fiber coupler is connected to an input end of the second photodetector, and a port 54 is connected to the optical fiber collimator, the port 50, the port 51, and the port 52 being located at the same side of the third optical fiber coupler and are opposite to the port 54; an output end of the first photodetector is connected to an input end of the first signal processing module, and an output end of the second photodetector is connected to an input end of the second signal processing module; an end face of a shearer drum perpendicular to a rotation axis is provided with a reflective coating perpendicular to parallel light emitted from the optical fiber collimator, a width of the reflective coating in a radial direction of the shearer drum being the same as a diameter of the parallel light beam emitted from the optical fiber collimator; the laser, the first optical fiber coupler, the optical isolator, the second optical fiber coupler, the third optical fiber coupler, the optical fiber collimator, the first photodetector, the second photodetector, the first signal processing module, and the second signal processing module all are disposed on a shearer ranging arm.

Further, the laser, the first optical fiber coupler, the optical isolator, the second optical fiber coupler, the third optical fiber coupler, the first photodetector, the second photodetector, the first signal processing module, and the second signal processing module are integrated into an intrinsically safe explosion-proof box and the intrinsically safe explosion-proof box is mounted on the shearer ranging arm.

Further, the reflective coating is a continuous ring concentric with the end face of the shearer drum.

Further, the first optical fiber coupler and the second optical fiber coupler each are a 1×2 optical fiber coupler, and the third optical fiber coupler is a 1×3 optical fiber coupler.

A synchronous monitoring method for radial and axial vibration of a shearer drum, comprising:

1) a shearer is started, a shearer drum is normally operated in a fully-mechanized mining face, and a laser starts to output light; and output light of the laser enters a first optical fiber coupler from a port 20 and thus is equally divided into two beams, wherein:

one beam output from a port 21 enters an optical isolator from a port 31 and is output from a port 32, then enters a third optical fiber coupler from a port 52 and is output from a port 54, and finally enters an optical fiber collimator to form a parallel light beam perpendicularly irradiating a reflective coating on the shearer drum, and the parallel light beam is reflected by the reflective coating and then is re-coupled to the optical fiber collimator; and the other beam output from a port 22 enters a second optical fiber coupler from a port 42;

2) the light reflected by the reflective coating and re-coupled to the optical fiber collimator enters the third optical fiber coupler from the port 54 and thus is equally divided into three beams, wherein:

one beam output from a port 51 enters the second optical fiber coupler from a port 41 and then interferes with the beam entering the second optical fiber coupler from the port 42, and the interference light is input to a first photodetector from a port 40;

one beam output from a port 50 is directly input to a second photodetector; and one beam output from the port 52 is isolated by an optical isolator;

3) the first photodetector converts the optical signal into an electrical signal and then inputs the same to a first signal processing module, and the second photodetector converts the optical signal into an electrical signal and then inputs the same to a second signal processing module; and 4) the first signal processing module processes the received signal: axial vibration of the shearer drum causes a change in a phase of the optical signal entering the second optical fiber coupler from the port 41, so that a phase difference is generated from the optical signal entering the second optical fiber coupler from the port 42, and the first signal processing module demodulates the received electrical signal containing phase difference information transmitted by the first photodetector so as to obtain axial vibration information of the shearer drum, thereby achieving monitoring of axial vibration of the shearer drum; and the second signal processing module processes the received signal: radial vibration of the shearer drum causes a change in a relative position of the reflective coating and the light emitted from the optical fiber collimator, so that the intensity of light entering the third optical fiber coupler from the port 54 changes relative to the original light intensity, and the second signal processing module demodulates the received electrical signal containing light intensity information transmitted by the second photodetector so as to obtain radial vibration information of the shearer drum, thereby achieving monitoring of radial vibration of the shearer drum.

Advantageous Effect

Compared with the prior art, the present invention has the following advantages:

(1) in the present invention, a laser, a first optical fiber coupler, an optical isolator, a second optical fiber coupler, a third optical fiber coupler, an optical fiber collimator, a first photodetector, a second photodetector, a first signal processing module, and a second signal processing module are disposed on a shearer ranging arm, and a reflective coating is disposed on a shearer drum; by measuring a phase difference between the original light and the reflected light, direct, non-contact and synchronous real-time monitoring of axial vibration of the shearer drum is realized; and by measuring an intensity difference between the original light and the reflected light, direct, non-contact and synchronous real-time monitoring of radial vibration of the shearer drum is realized;

(2) the present invention can monitor axial and radial vibration of the shearer drum without shutdown or disassembly, achieves synchronous real-time monitoring and evaluation of the health state of the shearer and ensures normal operation of coal mining, and thus has excellent industrial applicability;

(3) the monitoring elements in the present invention are basically optical components and parts, so that interference of a strong electromagnetic field in a fully-mechanized mining face is avoided and the monitoring sensitivity and precision are improved, and it is easy to operate; and (4) the present invention is not only suitable for synchronous real-time monitoring of axial and radial vibration of the shearer drum, but also suitable for vibration monitoring of other rotating machines, and has strong expandability.

BRIEF DESCRIPTION OF THE DRAWINGS

FIG. 1 is a schematic principle diagram of an optical path structure according to the present invention.

In the drawing: 1, laser; 2, first optical fiber coupler; 2-0, port 20; 2-1, port 21; 2-2, port 22; 3, optical isolator; 3-1, port 31; 3-2, port 32; 4, second optical fiber coupler; 4-0, port 40; 4-1, port 41; 4-2, port 42; 5, third optical fiber coupler; 5-0, port 50; 5-1, port 51; 5-2, port 52; 5-4, port 54; 6, optical fiber collimator; 7, first photodetector; 8, second photodetector; 9, first signal processing module; 10, second signal processing module; 11, intrinsically safe explosion-proof box; 12, shearer ranging arm; 13, shearer drum; 14, reflective coating.

DETAILED DESCRIPTION OF THE INVENTION

The present invention is further described below in conjunction with the accompanying drawings.

As shown in FIG. 1, a synchronous monitoring device for radial and axial vibration of a shearer drum comprises: a laser 1, a first optical fiber coupler 2, an optical isolator 3, a second optical fiber coupler 4, a third optical fiber coupler 5, an optical fiber collimator 6, a first photodetector 7, a second photodetector 8, a first signal processing module 9, and a second signal processing module 10. A port 20 2-0 of the first optical fiber coupler 2 is connected to an output end of the laser 1, a port 21 2-1 is connected to a port 31 3-1 of the optical isolator 3, and a port 22 2-2 is connected to a port 42 4-2 of the second optical fiber coupler 4; the port 21 2-1 and the port 22 2-2 are located at the same side of the first optical fiber coupler 2 and are opposite to the port 20 2-0. A port 32 3-2 of the optical isolator 3 is connected to a port 52 5-2 of the third optical fiber coupler 5; light only unidirectionally passes from the port 31 3-1 to the port 32 3-2 in the optical isolator 3. A port 40 4-0 of the second optical fiber coupler 4 is connected to an input end of the first photodetector 7, and a port 41 4-1 is connected to a port 51 5-1 of the third optical fiber coupler 5; the port 41 4-1 and the port 42 4-2 are located at the same side of the second optical fiber coupler 4 and are opposite to the port 40 4-0. A port 50 5-0 of the third optical fiber coupler 5 is connected to an input end of the second photodetector 8, and a port 54 5-4 is connected to the optical fiber collimator 6; the port 50 5-0, the port 51 5-1, and the port 52 5-2 are located at the same side of the third optical fiber coupler 5 and are opposite to the port 54 5-4. An output end of the first photodetector 7 is connected to an input end of the first signal processing module 9, and an output end of the second photodetector 8 is connected to an input end of the second signal processing module 10. An end face of a shearer drum 13 perpendicular to a rotation axis is provided with a reflective coating 14 perpendicular to parallel light emitted from the optical fiber collimator 6; a width of the reflective coating 14 in a radial direction of the shearer drum 13 is the same as a diameter of the parallel light beam emitted from the optical fiber collimator 6. The laser 1, the first optical fiber coupler 2, the optical isolator 3, the second optical fiber coupler 4, the third optical fiber coupler 5, the optical fiber collimator 6, the first photodetector 7, the second photodetector 8, the first signal processing module 9, and the second signal processing module 10 all are disposed on a shearer ranging arm 12.

The laser 1, the first optical fiber coupler 2, the optical isolator 3, the second optical fiber coupler 4, the third optical fiber coupler 5, the first photodetector 7, the second photodetector 8, the first signal processing module 9, and the second signal processing module 10 are integrated into an intrinsically safe explosion-proof box 11 mounted on the shearer ranging arm 12. Integrating the elements in the device by the intrinsically safe explosion-proof box 11 can not only avoid the risk caused by the harsh underground environment, but also facilitate arrangement, maintenance and installation of the elements.

The first optical fiber coupler 2 and the second optical fiber coupler 4 each are a 1×2 optical fiber coupler, and the third optical fiber coupler 5 is a 1×3 optical fiber coupler. The number of ports of the optical fiber couplers is identical to the actual number required, which avoids the impact of idle ports on the measurement results.

The reflective coating 14 is a continuous ring concentric with the end face of the shearer drum 13. The reflective coating 14 is a continuous ring, ensuring the real-time continuity of data measurement, and thus ensuring the accuracy of the measurement results.

A synchronous monitoring method for radial and axial vibration of a shearer drum, comprising the following steps:

1) a shearer is started, a shearer drum 13 is normally operated in a fully-mechanized mining face, and a laser 1 starts to output light; and output light of the laser 1 enters a first optical fiber coupler 2 from a port 20 2-0 and thus is equally divided into two beams, wherein:

one beam output from a port 21 2-1 enters an optical isolator 3 from a port 31 3-1 and is output from a port 32 3-2, then enters a third optical fiber coupler 5 from a port 52 5-2 and is output from a port 54 5-4, and finally enters an optical fiber collimator 6 to form a parallel light beam perpendicularly irradiating a reflective coating 14 on the shearer drum 13, and the parallel light beam is reflected by the reflective coating 14 and then is re-coupled to the optical fiber collimator 6; and the other beam output from a port 22 2-2 enters a second optical fiber coupler 4 from a port 42 4-2;

2) the light reflected by the reflective coating 14 and re-coupled to the optical fiber collimator 6 enters the third optical fiber coupler 5 from the port 54 5-4 and thus is equally divided into three beams, wherein:

one beam output from a port 51 5-1 enters the second optical fiber coupler 4 from a port 41 4-1 and then interferes with the beam entering the second optical fiber coupler 4 from the port 42 4-2, and the interference light is input to a first photodetector 7 from a port 40 4-0;

one beam output from a port 50 5-0 is directly input to a second photodetector 8; and one beam output from the port 52 5-2 is isolated by an optical isolator 3;

3) the first photodetector 7 converts the optical signal into an electrical signal and then inputs the same to a first signal processing module 9, and the second photodetector 8 converts the optical signal into an electrical signal and then inputs the same to a second signal processing module 10; and 4) the first signal processing module 9 processes the received signal: axial vibration of the shearer drum 13 causes a change in a phase of the optical signal entering the second optical fiber coupler 4 from the port 41 4-1, so that a phase difference is generated from the optical signal entering the second optical fiber coupler 4 from the port 42 4-2, and the first signal processing module 9 demodulates the received electrical signal containing phase difference information transmitted by the first photodetector 7 so as to obtain axial vibration information of the shearer drum 13, thereby achieving monitoring of axial vibration of the shearer drum 13;

where a mapping relationship $\Delta\varphi=f(|\Delta S_1|)$ between a phase difference $\Delta\varphi$ of two beams interfering with each other in the second optical fiber coupler 4 and an axial vibration displacement $\Delta S_1$ of the shearer drum 13 is obtained through calibration and least squares data fitting, that is, an operating state of the shearer is simulated in a laboratory, a series of data for the phase difference $\Delta\varphi$ corresponding to the axial vibration displacement $\Delta S_1$ are measured and plotted as a curve, and a scale factor is fit on the plotted measurement curve by using a data fitting method such as the least square method, so that the axial vibration displacement $\Delta S_1$ can be obtained according to the measured phase difference $\Delta\varphi$ in a practical operation of the shearer; and the second signal processing module 10 processes the received signal: radial vibration of the shearer drum 13 causes a change in a relative position of the reflective coating 14 and the light emitted from the optical fiber collimator 6, so that the intensity of light entering the third optical fiber coupler 5 from the port 54 5-4 changes relative to the original light intensity, and the second signal processing module 10 demodulates the received electrical signal containing light intensity information transmitted by the second photodetector 8 so as to obtain radial vibration information of the shearer drum 13, thereby achieving monitoring of radial vibration of the shearer drum 13;

where a mapping relationship $\Delta P=g(|\Delta S_2|)$ between an intensity change $\Delta P$ of light reflected by the reflective coating 14 and then coupled to the optical fiber collimator 6 and a radial vibration displacement $\Delta S_2$ of the shearer drum 13 is obtained through calibration and least squares data fitting, that is, an operating state of the shearer is simulated in a laboratory, a series of data for the light intensity change $\Delta P$ corresponding to the radial vibration displacement $\Delta S_2$ are measured and plotted as a curve, and a scale factor is fit on the plotted measurement curve by using a data fitting method such as the least square method, so that the radial vibration displacement $\Delta S_2$ can be obtained according to the measured light intensity change $\Delta P$ in a practical operation of the shearer.

What is claimed is:

1. A synchronous monitoring device for radial and axial vibration of a shearer drum, comprising:
 a laser,
 a first optical fiber coupler, an optical isolator,
 a second optical fiber coupler,
 a third optical fiber coupler,
 an optical fiber collimator,
 a first photodetector,
 a second photodetector,
 a first signal processing module, and
 a second signal processing module,
 wherein a port (20) of the first optical fiber coupler is connected to an output end of the laser, a port (21) is connected to a port (31) of the optical isolator, and a port (22) is connected to a port (42) of the second optical fiber coupler, the port (21) and the port (22) are located at a same side of the first optical fiber coupler and are opposite to the port (20);
 a port (32) of the optical isolator is connected to a port (52) of the third optical fiber coupler;
 a port (40) of the second optical fiber coupler is connected to an input end of the first photodetector, and a port (41) is connected to a port (51) of the third optical fiber coupler, the port (41) and the port (42) are located at a same side of the second optical fiber coupler and are opposite to the port(40);
 a port (50) of the third optical fiber coupler is connected to an input end of the second photodetector, and a port (54) is connected to the optical fiber collimator, the port (50), the port (51), and the port (52) are located at the same side of the third optical fiber coupler and are opposite to the port(54);
 an output end of the first photodetector is connected to an input end of the first signal processing module, and an output end of the second photodetector is connected to an input end of the second signal processing module;
 an end face of the shearer drum perpendicular to a rotation axis is provided with a reflective coating perpendicular to a parallel light beam emitted from the optical fiber collimator; a width of the reflective coating in a radial direction of the shearer drum is the same as a diameter of the parallel light beam emitted from the optical fiber collimator;
 the laser, the first optical fiber coupler, the optical isolator, the second optical fiber coupler, the third optical fiber coupler, the optical fiber collimator, the first photodetector, the second photodetector, the first signal processing module, and the second signal processing module all are disposed on a shearer ranging arm.

2. The synchronous monitoring device for radial and axial vibration of the shearer drum according to claim 1, wherein the laser, the first optical fiber coupler, the optical isolator, the second optical fiber coupler, the third optical fiber coupler, the first photodetector, the second photodetector, the first signal processing module, and the second signal processing module are integrated into an intrinsically safe explosion-proof box and the intrinsically safe explosion-proof box is mounted on the shearer ranging arm.

3. The synchronous monitoring device for radial and axial vibration of the shearer drum according to claim 2, wherein the reflective coating is a continuous ring concentric with the end face of the shearer drum.

4. The synchronous monitoring device for radial and axial vibration of the shearer drum according to claim 3, wherein the first optical fiber coupler and the second optical fiber coupler each are a 1×2 optical fiber couplers, and the third optical fiber coupler is a 1×3 optical fiber coupler.

5. The synchronous monitoring device for radial and axial vibration of the shearer drum according to claim 1, wherein the reflective coating is a continuous ring concentric with the end face of the shearer drum.

6. The synchronous monitoring device for radial and axial vibration of the shearer drum according to claim 5, wherein the first optical fiber coupler and the second optical fiber coupler each are a 1×2 optical fiber couplers, and the third optical fiber coupler is a 1×3 optical fiber coupler.

7. A synchronous monitoring method for radial and axial vibration of a shearer drum, comprising the following steps:
 1) starting a shearer, so that a shearer drum is normally operated in a fully-mechanized mining face, and a laser starts to output light; and output light of the laser enters a first optical fiber coupler from a port (20) and the output light is equally divided into two beams of light, wherein:
 a first beam of light output from a port (21) enters an optical isolator from a port (31) and is output from a port (32), then the first beam of light enters a third optical fiber coupler from a port (52) and is output from a port (54), and finally the first beam of light enters an optical fiber collimator to form a parallel light beam perpendicularly irradiating a reflective coating on the shearer drum, and the parallel light beam is reflected by the reflective coating and then is re-coupled to the optical fiber collimator to form a coupled light beam; and
 a second beam of light output from a port (22) enters a second optical fiber coupler from a port (42);
 2) the coupled light beam enters the third optical fiber coupler from the port (54) and is equally divided into three beams of light, wherein:
 a third beam of light output from a port (51) enters the second optical fiber coupler from a port (41) and then interferes with the second beam of light entering the second optical fiber coupler from the port (42) to form interference light, and the interference light is input to a first photodetector from a port (40);
 a fourth beam of light output from a port (50) is directly input to a second photodetector; and
 a fifth beam of light output from the port (52) is isolated by an optical isolator;
 3) the first photodetector converts a first optical signal into a first electrical signal and then inputs the first electrical signal to a first signal processing module, and the second photodetector converts the optical signal into a second electrical signal and then inputs the second electrical signal to a second signal processing module; wherein the first optical signal is formed by the first beam of light, the second beam of light, the third beam of light, the fourth beam of light and the fifth beam of light; and
 4) the first signal processing module processes the first electrical signal: axial vibration of the shearer drum causes a change in a phase of a second optical signal formed by the third beam of light entering the second optical fiber coupler from the port (41), so that a phase difference is generated between the second optical signal and a third optical signal formed by the second beam of light entering the second optical fiber coupler from the port (42) and the first signal processing module demodulates the first electrical signal containing phase difference information transmitted by the first photodetector so as to obtain axial vibration information of the shearer drum, thereby achieving monitoring of the axial vibration of the shearer drum; and the second signal processing module processes the second electrical signal: radial vibration of the shearer drum causes a change in a relative position of the reflective coating and the light beam emitted from the optical fiber collimator, so that an intensity of the light beam entering the third optical fiber coupler from the port (54) changes relative to an original light intensity, and the second signal processing module demodulates the second electrical signal containing light intensity information transmitted by the second photodetector so as to obtain radial vibration information of the shearer drum, thereby achieving monitoring of the radial vibration of the shearer drum.

\* \* \* \* \*